(12) United States Patent
Kanazawa et al.

(10) Patent No.: US 6,491,356 B2
(45) Date of Patent: Dec. 10, 2002

(54) BRAKE SYSTEM

(75) Inventors: Osamu Kanazawa, Saitama-Ken (JP);
Yoshiyasu Takasaki, Saitama-Ken (JP);
Michio Kobayashi, Saitama-Ken (JP);
Hiroshi Ohsaki, Saitama-Ken (JP);
Masahiro Ikeda, Saitama-Ken (JP);
Hiroyuki Oka, Saitama-Ken (JP);
Hiroaki Niino, Aichi-Pref (JP); Kazuya Maki, Aichi-Pref (JP); Mamoru Sawada, Aichi-Pref (JP)

(73) Assignees: Bosch Braking Systems Co., Ltd., Tokyo (JP); Denso Corporation, Kariya (JP)

( * ) Notice: Subject to any disclaimer, the term of this patent is extended or adjusted under 35 U.S.C. 154(b) by 0 days.

(21) Appl. No.: 09/771,777

(22) Filed: Jan. 29, 2001

(65) Prior Publication Data
US 2002/0008424 A1 Jan. 24, 2002

(30) Foreign Application Priority Data
Jul. 21, 2000 (JP) ......................................... 2000-221412

(51) Int. Cl.[7] .............................. F15B 13/16; B60J 13/00
(52) U.S. Cl. ...................................... 303/114.3; 91/367
(58) Field of Search .......................... 303/114.1, 114.3; 91/369.3, 367, 376 R

(56) References Cited

U.S. PATENT DOCUMENTS 5,626,069 A * 5/1997 Uyama ..................... 91/369.3
5,645,145 A * 7/1997 Ikeda .......................... 188/356
6,119,577 A * 9/2000 Takasaki et al. ............... 91/367
6,155,156 A * 12/2000 Takasaki et al. ............... 91/367
6,332,391 B1 * 12/2001 Ikeda et al. ................... 91/367

* cited by examiner

Primary Examiner—Christopher P. Schwartz
(74) Attorney, Agent, or Firm—Flynn, Thiel, Boutell & Tanis, P.C.

(57) ABSTRACT

The invention relates to a brake system including a brake booster. A pneumatic pressure operated brake booster VBB or a liquid pressure operated brake booster includes a valve mechanism which is urged by a force of depression applied to a brake pedal BP to switch a flow path to cause the brake booster to develop an output which depends on the magnitude of the force of depression. A solenoid SOL urges the valve mechanism in the same direction as or in the opposite direction from the force of depression. A controller ECU is responsive to a braking effort increase/decrease demand signal to increase or decrease the urging force which is applied by the solenoid to the valve mechanism, thus increasing or decreasing the output from the brake booster. An output from the brake booster can be freely controlled independently from the force of depression applied to the brake pedal in response to a braking effort increase/decrease demand. The arrangement is applicable to a wide variety of brake systems onboard a vehicle such as a regenerative brake unit, an engine brake or an exhaust gas brake unit or a brake assisting apparatus.

12 Claims, 12 Drawing Sheets

BRAKE SYSTEM

FIELD OF THE INVENTION

The present invention relates to a brake system including a brake booster as may be used as a brake for automobiles.

DESCRIPTION OF THE PRIOR ART

A brake system is known in the art which includes a pneumatic or liquid pressure operated brake booster.

By way of example, a pneumatic pressure operated brake booster comprises a valve body slidably disposed within a shell, a power piston mounted on the valve body, a constant and a variable pressure chamber defined across the power piston, a valve mechanism disposed in the valve body for a switching control of flow paths therein, and an input shaft mechanically coupled to a brake pedal and adapted to drive a valve plunger, which forms part of the valve mechanism, to switch the flow path. The valve mechanism is urged by a depression force applied to the brake pedal to switch the flow path, thereby developing an output in accordance with the magnitude of the depression force.

A brake system obtains the output from the brake booster having a magnitude which depends on the magnitude of the depression force applied to the brake pedal, but a demand is sometimes placed such that the output from the brake booster can be freely controlled during the braking operation independently from an input applied to the brake booster.

For example, a brake system on a vehicle which is provided with a regenerative brake unit may be required to reduce the output from the brake booster during the braking operation independently from the input to the brake booster. Because the regenerative brake unit produces a braking effort when it is operated, it follows that if the depression force to the brake pedal is maintained constant, a variation in the braking effort produced by the regenerative brake unit results in a variation in the total braking effort, causing a driver to feel an unnaturalness.

In this instance, if the braking effect which results from the brake booster could be diminished by an amount corresponding to the braking effort produced by the regenerative brake unit as it is operated, the total braking effort could be maintained constant, avoiding the feeling of unnaturalness which the driver would experience otherwise. The same is true when an engine brake or an exhaust gas brake is operated.

On the other hand, there is also an instance where it is demanded to increase the output from the brake booster independently from the input applied to the brake pedal. This occurs, for example, with a brake system which is provided with a brake assisting apparatus that is designed to provide an increased output during a quick braking operation than during a normal brake pedal depression, thus enabling a powerless person or aged driver to perform a quick braking operation.

Another instance of demanding an increased output from the brake booster occurs when running on a down grade or with an increased payload onboard.

In this manner, there is a demand for a free control over the output of the brake booster in many instances, but the practice in the prior art has been to accommodate for such demand by employing a devoted arrangement individually from system to system, which lacks a universality. To meet the demand, an increased number of parts are required including a solenoid operated valve, a pump or the like, and are used in a complicated arrangement, which results in an increased cost.

On the other hand, there is also an instance where it is demanded to increase the output from the brake booster independently from the input applied to the brake pedal. This occurs, for example, with a brake system which is provided with a brake assisting apparatus that is designed to provide an increased output during a quick brake operation than during a normal brake pedal depression, thus enabling a powerless woman or aged driver to perform a quick brake operation.

Another instance of demanding an increased output from the brake booster occurs when running on a down grade or with an increased payload onboard.

In this manner, there is a demand for a free control over the output of the brake booster in many instances, but the practice in the prior art has been to accommodate for such demand by employing a devoted arrangement individually from system to system, which lacks a universality. To meet the demand, an increased number of parts are required including a solenoid operated valve, a pump or the like, and are used in a complicated arrangement, which results in an increased cost.

SUMMARY OF THE INVENTION

In view of the foregoing, the present invention intends to provide a brake system which permits an output from a brake booster to be freely controlled independently from a depression force applied to a brake pedal in response to a braking effort increase/decrease demand.

Specifically, in accordance with the invention, there is provided a brake system comprising a valve mechanism of a brake booster, the valve mechanism being urged in response to a depression force applied to a brake pedal to switch a flow path therein to thereby cause the brake booster to develop an output in accordance with the magnitude of the depression force, and a solenoid for urging the valve mechanism in either the same direction as or in the opposite direction from the depression force, the solenoid being responsive to a braking effort increase/decrease demand to increase/decrease the urging force applied to the valve mechanism and hence the output from the brake booster.

During a normal braking operation, the valve mechanism is urged to switch a flow path in response to the depression force applied to the brake pedal, causing an output to be developed in accordance with the magnitude of the depression force. In response to a braking effort increase demand signal, for example, the solenoid increases the urging force applied to the valve mechanism in accordance with the signal, thereby increasing the output from the brake booster.

In this manner, the urging force which is applied to the valve mechanism from the solenoid can be increased or decreased, and accordingly, if the depression force applied to the brake pedal remains constant, the output from the brake booster can be freely controlled.

Above, and other objects, features and advantages of the invention will become apparent from the following description of several embodiments thereof with reference to the attached drawings.

DETAILED DESCRIPTION OF THE EMBODIMENTS

Figure 1:
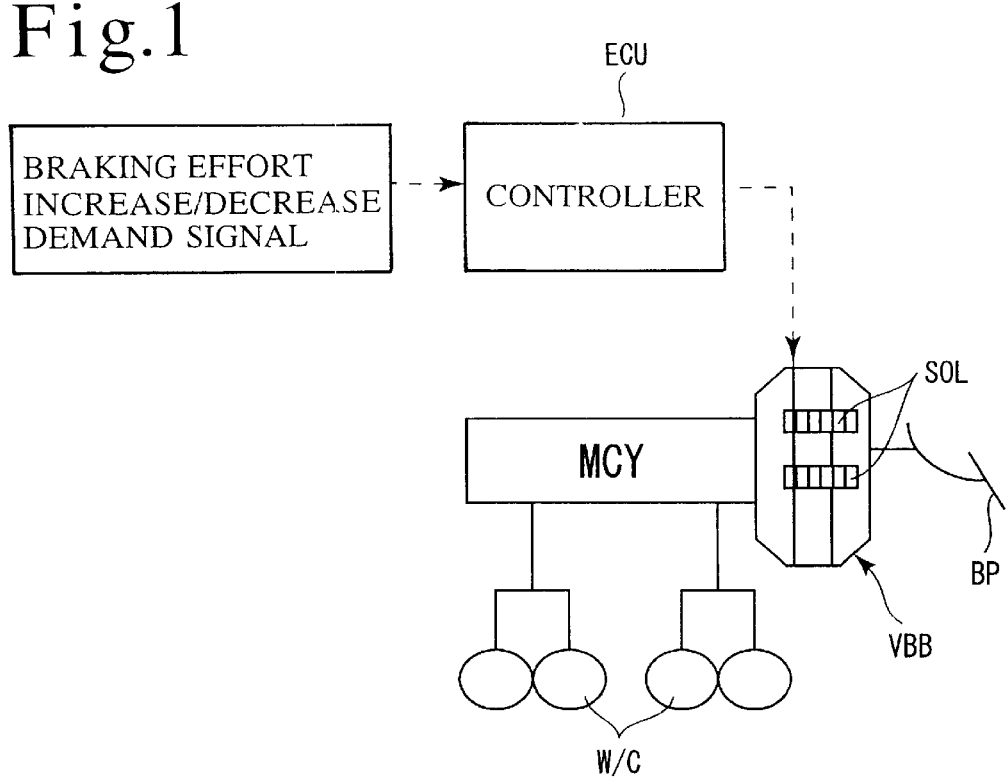
FIG. 1 is a schematic view of a first embodiment of the invention.
Figure 2:
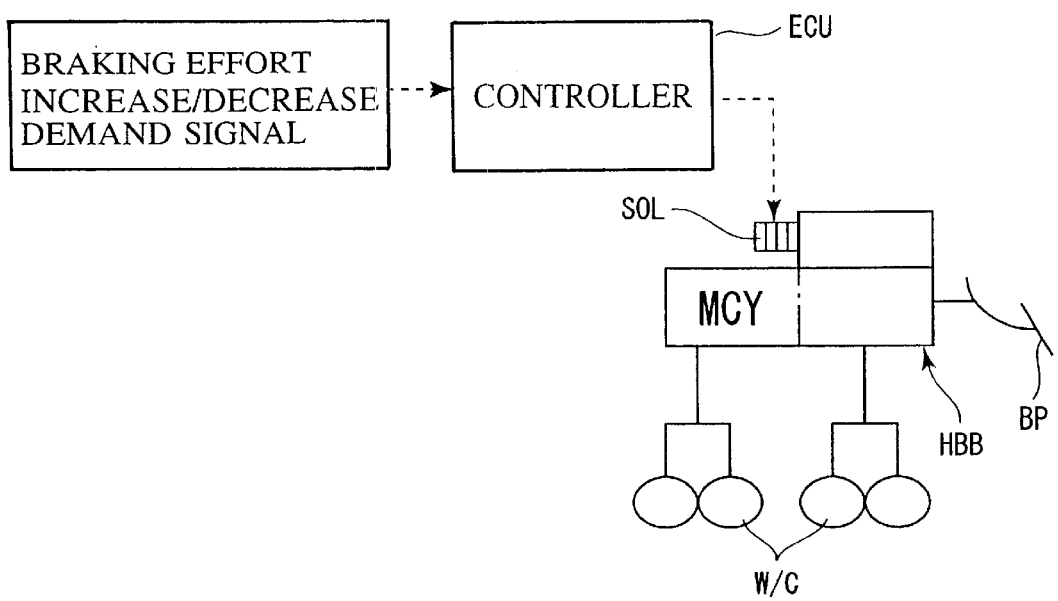
FIG. 2 is a schematic view of a second embodiment of the invention.

Referring to the drawings, several embodiments of the invention will now be described. FIG. 1 shows an embodiment in which the present embodiment is applied to a brake system using a pneumatic pressure operated brake booster VBB, and FIG. 2 shows an embodiment in which the invention is applied to a brake system using a liquid pressure operated brake booster HBB.

Both the pneumatic pressure operated brake booster VBB and the liquid pressure operated brake booster HBB include a valve mechanism which is urged in response to a depression force applied to a brake pedal to switch a flow path, causing an output to be developed from the brake booster in accordance with the magnitude of the depression force, as is well known in the art. Either brake booster VBB, HBB includes a master cylinder MCY having a piston which may be driven forward by the brake booster to produce a braking liquid pressure, which is then supplied to wheel cylinders W/C to effect a braking action.

Figure 3:
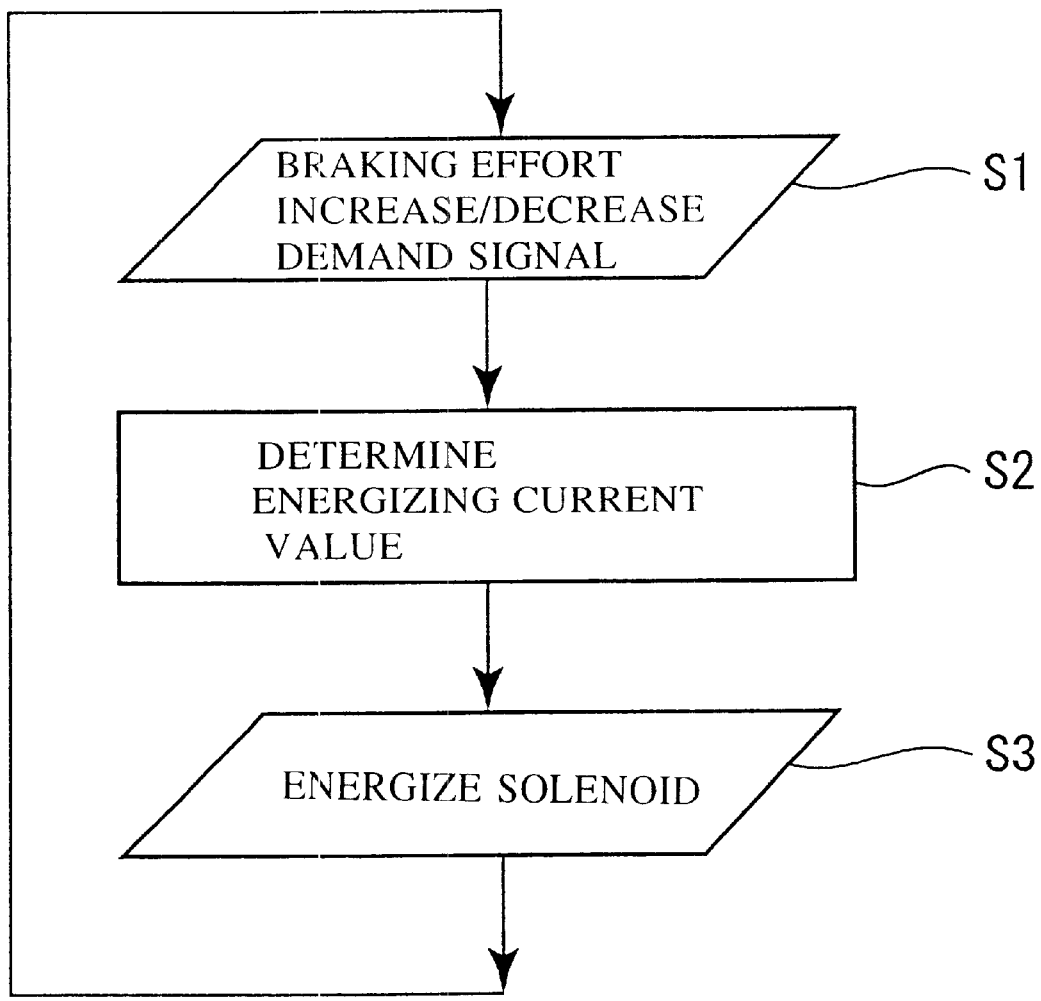
FIG. 3 is a flow chart of an operation executed by a controller ECU shown in FIGS. 1 and 2.

As will be more specifically described later, each of the brake boosters VBB, HBB includes a solenoid SOL which urges the valve mechanism in either the same direction as or in the opposite direction from the depression force. The urging force from the solenoid SOL is controlled by a controller ECU. As shown in FIG. 3, in response to a braking effort increase/decrease demand signal (S1), the controller determines the value of an energizing current to the solenoid SOL in accordance with the magnitude of the demand signal (S2), and energizes the solenoid with the current thus determined to increase or decrease the urging force (S3), thus increasing or decreasing the output from the brake booster.

The braking effort increase/decrease demand signal can be obtained from a variety of devices.

By way of example, a device which produces a braking effort decrease demand signal may include a regenerative brake unit. In the brake system including a regenerative brake unit, a braking effort is-produced in the operative condition of the regenerative brake unit, and accordingly, if the depression force applied to the brake pedal BP is maintained constant, a variation in the braking effort produced by the regenerative brake unit results in a variation in the total braking effort, causing the driver to experience a feeling of unnaturalness. In this instance, a signal indicating the operative condition of the regenerative brake unit or a braking effort decrease demand signal is supplied from the regenerative brake unit to the controller.

The controller CU contains a relationship between the magnitude of braking effort decrease demand signal and the value of the energizing current to be fed to the solenoid SOL which corresponds to this magnitude in the form of a table or a calculation formula. A relationship between the value of energizing current fed to the solenoid and the resulting reduction in the braking effort is also determined by this table or calculation formula.

Accordingly, in response to the braking effort decrease demand signal from the regenerative brake unit, the controller ECU determines the value of an energizing current to be fed to the solenoid SOL in accordance with the magnitude of the demand signal (or after calculating the magnitude of the demand signal on the basis of an input from the regenerative brake unit), and energizes the solenoid SOL with the current thus determined.

When the solenoid SOL is energized in this manner, the urging force applied to the valve mechanism is reduced in a manner corresponding to the value of the energizing current to decrease the output from the brake booster. In this manner, the braking effort from the brake booster can be reduced by an amount corresponding to an increase in the braking effort which is produced by the operation of the regenerative brake unit. As a consequence, if the operation of the regenerative brake unit undergoes a variation in the braking effort produced thereby, the total braking effort can be maintained constant, thus avoiding a feeling of unnaturalness which may be experienced by a driver.

A braking effort decrease demand signal may also be produced by an arrangement which utilizes an engine brake or an exhaust gas brake.

On the other hand, a braking effort increase demand signal may be produced by a brake assisting apparatus which operates to increase the braking effort in response to a depression force during a quick braking operation. More specifically, the brake assisting apparatus is arranged to detect the rate at which the brake pedal is depressed or the rate of increase in the braking liquid pressure. When this rate signal exceeds a predetermined value, it decides that a quick braking operation is taking place, thus feeding a braking effort increase demand signal to the controller ECU.

The controller ECU contains a relationship between the magnitude of the braking effort increase demand signal and the value of the energizing current which is to be fed to the solenoid SOL in response to the magnitude of such demand signal in the form of a table or a calculation formula. Also, the relationship between the value of the energizing current fed to the solenoid SOL and the resulting increase in the braking effort can be previously determined.

Accordingly, in response to the braking effort increase demand signal which is fed from the brake assisting apparatus, the controller ECU determines the value of an energizing current which is to be fed to the solenoid SOL on the basis of the magnitude of the demand signal (or on the basis of the difference between the input from the brake assisting apparatus and the given value as reflecting the magnitude of this increase demand signal), and energizes the solenoid SOL with the current thus determined.

When the solenoid SOL is energized, the urging force applied to the valve mechanism is increased in accordance with the energizing current to increase the output from the brake booster, thus increasing the braking effort during the quick braking operation and allowing a powerless person or an aged driver to achieve a quick braking operation. As mentioned above, an increase in the braking effort depends on the depression force applied to the brake pedal, and accordingly, an increase can be controlled according to the intent of the driver.

A braking effort increase demand signal may also be produced by an arrangement in which a down grade is detected to increase the braking effort in accordance with the magnitude of the grade or an arrangement in which an onboard payload is detected to increase the braking effort in accordance with the payload.

Figure 4:
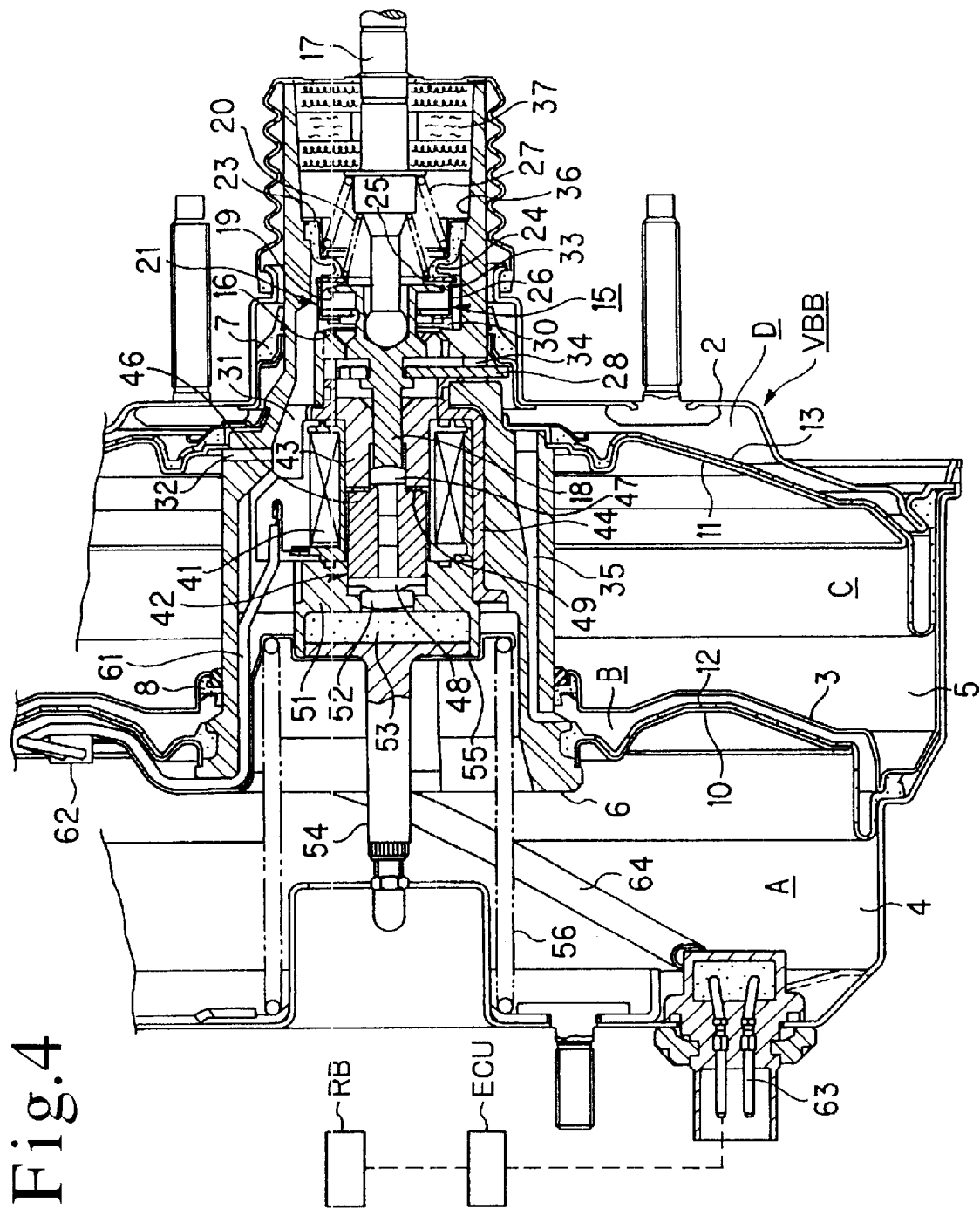
FIG. 4 is a cross section of a specific form of the first embodiment shown in FIG. 1.

A specific form of brake system using the regenerative brake unit RB (FIG. 4) as a device which produces a braking effort decrease demand signal while using the pneumatic pressure operated brake booster VBB shown in FIG. 1 will be described. In FIG. 4, a tandem brake booster VBB includes a shell 2, the interior of which is partitioned by a center plate into a front chamber 4 and a rear chamber 5. A tubular valve body 6 slidably extends through the rear portion of the shell 2 and the center plate 3 with seal means 7, 8 interposed therebetween which maintain a hermetic seal thereat.

A front power piston 10 and a rear power piston 11 are connected to the outer periphery of the valve body 6 in regions which are located within the front chamber 4 and the rear chamber 5, respectively, and a front diaphragm 12 and a rear diaphragm 13 are applied to the back surfaces of the power pistons 10 and 11, respectively. Within the front chamber 4, a constant pressure chamber A and a variable pressure chamber B are defined across the front diaphragm 12 while a constant pressure chamber C and a variable pressure chamber D are defined across the rear diaphragm 13 within the rear chamber 5.

A valve mechanism 15 which switches a communication between the constant pressures A, C and the variable pressure chambers B, D is disposed within the valve body 6.

Figure 5:
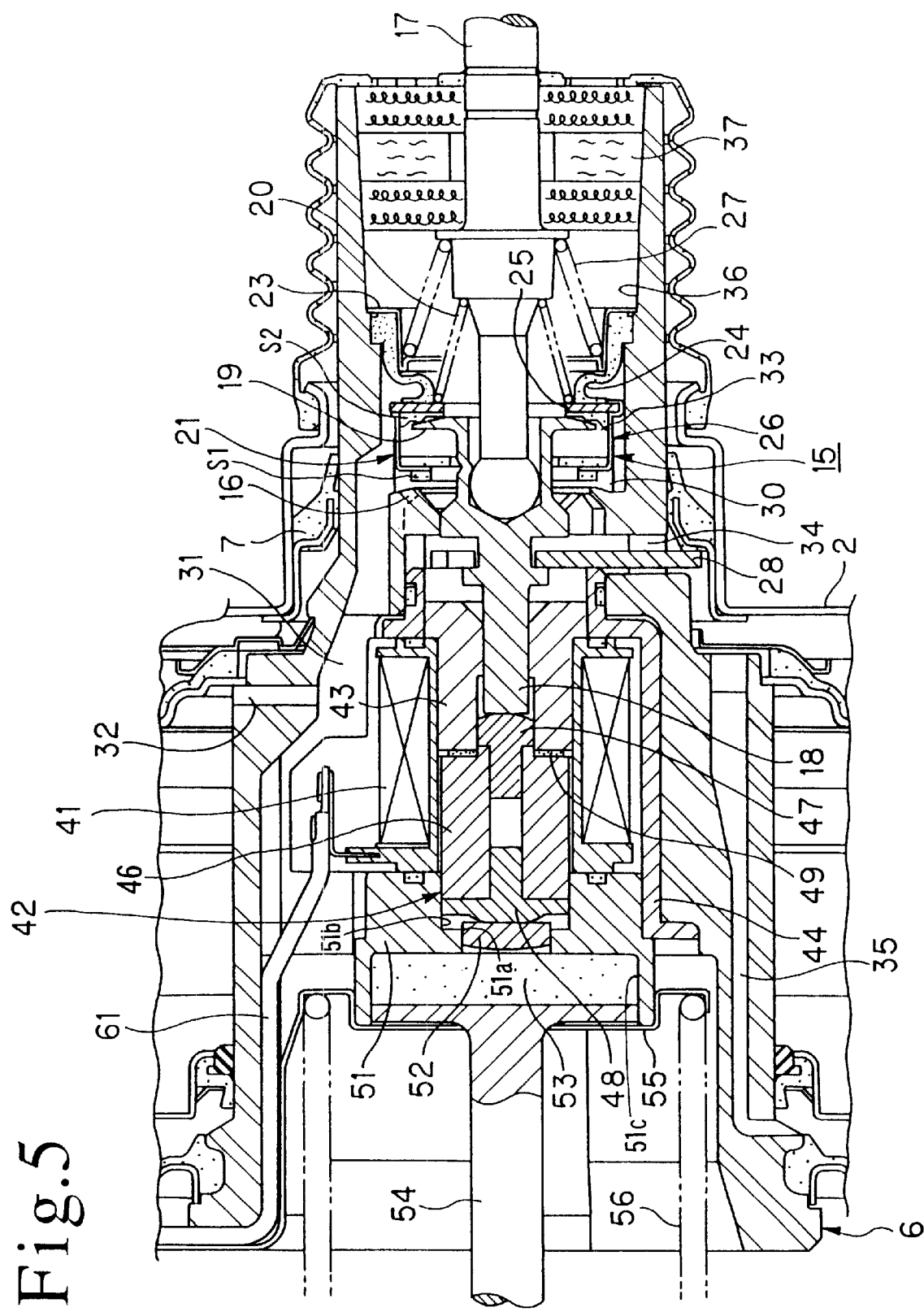
FIG. 5 is a cross section, to an enlarged scale, of an essential part shown in FIG. 4.

As shown to an enlarged scale in FIG. 5, the valve mechanism 15 comprises a first valve seat 16 formed on the distal end of an annular projection extending rearwardly from the inner periphery of the valve body 6, and a valve plunger 18 which is slidably fitted into the valve body 6 and mechanically coupled to an input shaft 17, a second valve seat 19 being formed on the rear end of the valve plunger 18. A valve element 21 is urged forwardly by a poppet return spring 20, and includes a first seat area S1 which is adapted to be seated on the first valve seat 16 and a second seat area S2 which is adapted to be seated upon the second valve seat 19.

The valve element 21 comprises a rolling portion 24 having a rear end which is hermetically secured to the valve body 6 by a substantially tubular retainer 23, a backup plate 25 connected to the front end of the rolling portion 24, and a tubular portion 26 connected to the backup plate 25 and extending forwardly. The first seat area S1 is provided on the distal end of the tubular portion 26 and is formed of an elastomer so as to be seated upon the first valve seat 16 while the second seat area S2 which is adapted to be seated upon the second valve seat 19 is formed on the front end face of the backup plate 25 and is formed of an elastomer.

A valve return spring 27 is disposed between the retainer 23 and the input shaft 17, and the resilience of the valve return spring 27 urges the input shaft 17 and its connected valve plunger 18 and the valve element 21 which is seated on the second valve seat 19 of the valve plunger 18 rearward.

A withdrawal of the valve plunger 18 from the valve body 6 is prevented by a key member 28, which is well known in the art, and when the booster is inoperative, the key member 28 is brought into abutment against the seal member 7 mounted on the shell 2, thus maintaining the valve plunger 18 at an advanced position relative to the valve body 6.

The valve mechanism 15 also comprises an axial constant pressure passage 31 formed in the valve body 6 for communicating a space located radially outward of a vacuum valve 30 formed by a combination of the first valve seat 16 and the first seat area S1 with the constant pressure chamber A, and a radial constant pressure passage 32 which provides a communication between the constant pressure passage 31 and the constant pressure chamber C. A negative pressure is normally introduced into the constant pressure chambers A, C by communicating the constant pressure chamber A with an intake manifold of an engine through a tubing (not shown) mounted on the shell 2 for introducing a negative pressure.

A space located intermediate an atmosphere valve 33 formed by a combination of the second valve seat 19 and the second seat area S2 and the vacuum valve 30 communicates with the variable pressure chamber B through a radial variable pressure passage 34, and the variable pressure chamber B communicates with the other variable pressure chamber D through an axial variable pressure passage 35.

A space located radially inward of the atmosphere valve 33 communicates with the atmosphere through an atmosphere passage 36, in which a filter 37 is disposed.

A solenoid 41 and a solenoid plunger 42, which in combination urge the valve plunger 18 rearward, are disposed forwardly of the valve plunger 18. The solenoid 41 is in the form of a ring, the right end of which is attached with a tubular member 43 of a small diameter. The solenoid 41 and the tubular member 43 are received within a stepped tubular member 44 of a larger diameter, which is then mounted in the valve body 6.

The solenoid plunger 42 comprises a tubular member 46, and a pair of abutment members 47, 48 which are secured as a press fit into the opposite ends of the tubular member 46. The tubular member 46 is slidably fitted inside the solenoid 41 at a location forwardly of the tubular member 43 while the rear abutment member 47 is slidably fitted into the tubular member 43 of a smaller diameter. The front end of the valve plunger 18 is slidably fitted into the tubular member 43 so that the front end of the valve plunger 18 can abut against the rear end of the abutment member 47. It is to be noted that the rear end face of the abutment member 47 is formed to define part of a spherical surface, and a resilient member 49 such as formed of rubber is applied to the rear end face of the tubular member 46 in order to prevent a percussion sound from occurring as the tubular member 46 impacts the tubular member 43.

A tubular holder 51 is mounted forwardly of the stepped tubular member 44 and has a central opening 51 of a small diameter in which a plate plunger 52 is slidably disposed. The tubular holder 51 is also formed with an opening 51b of a medium diameter which continues rearwardly from the opening 51a and into which the left end of the tubular member 46 and the abutment member 48, which form together the solenoid plunger 42, are slidably fitted, thus allowing the abutment member 48 to abut against the plate plunger 52.

The front end face of the abutment member 48 is formed into part of a spherical surface in the similar manner as the abutment member 47 so that any tilting of the valve plunger 18 or the plate plunger 52 can hardly be transmitted to the solenoid plunger 42,,thus preventing the solenoid plunger 42 from sticking.

The tubular holder 51 is formed with an opening 5 1c of a large diameter at a location forwardly of the opening 51a, and a reaction disc 53 and one end of an output shaft 54 are fitted into the opening 5 1c. The distal end of the output shaft 54 projects externally through an axial portion of the shell 2 to be mechanically coupled to the piston of a master cylinder, not shown.

A return spring 56 is disposed between the inner front wall of the shell 2 and a retainer 55 which is disposed in abutment against the valve body 6 for normally maintaining the valve body 6 in its inoperative position shown. The retainer 55 is effective to prevent said one end of the output shaft 54 and the reaction disc 53 from being disengaged from within the opening 51c.

The solenoid 41 includes a lead wire 61 which is pulled forwardly of the valve body 6 through the constant pressure passage 31 and which is connected to a connection terminal 62 mounted on the retainer 55. A flexible wire 64 extends between the connection terminal 62 and a connection terminal 63 which is provided on the front end face of the shell 2. The connection terminal 63 is connected with the controller ECU.

The controller ECU is arranged to receive a signal from the regenerative brake unit RB. The controller ECU calculates the regenerative braking effort produced by the regenerative brake unit RB or the magnitude of a braking effort decrease demand signal on the basis of this signal and controls an energizing current fed to the solenoid 41 on the basis of the result of such calculation, thus urging the solenoid plunger 42 rearward with an urging force which depends on the regenerative braking effort.

The regenerative brake unit RB utilizes a motor which drives wheels of an electrically driven vehicle to effect a regenerative braking operation, which is known in the art and therefore will not be specifically described.

Operation

With the above arrangement, when a brake pedal, not shown, is depressed, the controller ECU energizes the solenoid 41 only when the regenerative brake unit RB is operative. When brake unit RB is operative, the controller calculates the magnitude of energization for the solenoid 41 in accordance with the regenerative braking effort produced, and energizes the solenoid plunger 42 with an urging force which corresponds to the regenerative braking effort.

In other words, when the regenerative brake unit RB is inoperative as when the vehicle is in parked condition or its battery is being charged, the solenoid 41 is not energized. If the brake pedal is now depressed, the valve mechanism 15 switches its flow path in the similar manner as in the conventional brake booster which is not provided with the solenoid 41. A resulting characteristic diagram of the brake booster VBB is shown by a line A in FIG. 6.

Figure 6:
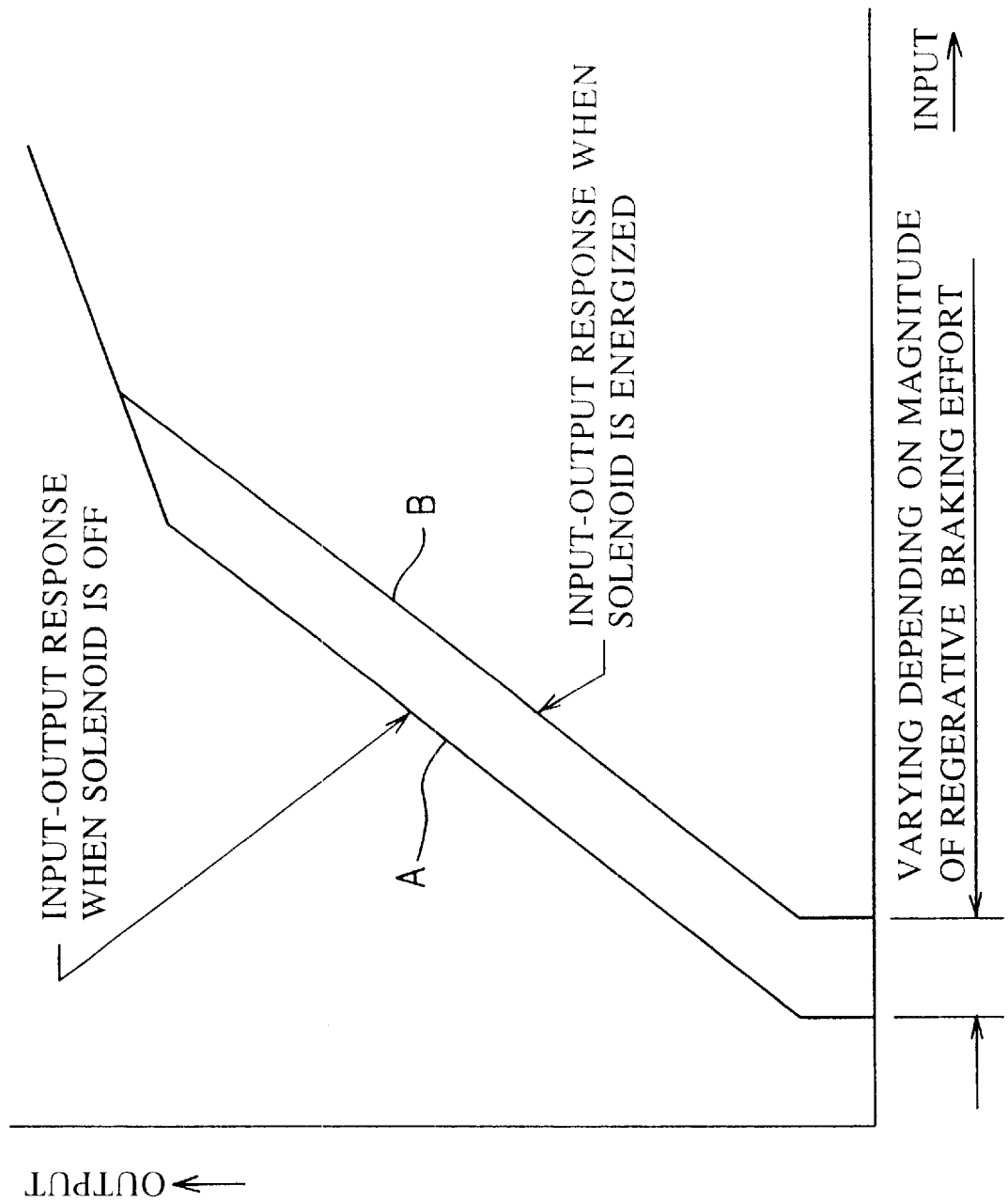
FIG. 6 shows characteristic diagrams of the invention.

On the other hand, when the solenoid 41 is energized, the solenoid plunger 42 is urged rearward to urge the valve plunger 18 rearward, whereby an output from the brake booster will be reduced by an amount corresponding to the urging force or a regenerating braking effort, as indicated by a line B shown in FIG. 6. The greater the regenerative braking effort, the greater the urging force with which the valve plunger 18 is urged rearward, and accordingly, the diagram B shifts to the right as viewed in FIG. 6. The less the regenerative braking effort, the less the urging force with which the valve plunger 18 is urged rearward, and accordingly the diagram B shifts to the left, as viewed in FIG. 6.

When the brake pedal is depressed, the brake booster VBB becomes operative to develop an output which corresponds to the force of depression, thus producing a braking effort. If the regenerative brake unit RB operates to produce a braking effort under this condition, the controller ECU detects the operation of the regenerative brake unit RB to energize the solenoid 41. At this time, the controller ECU energizes the solenoid 41 in a manner corresponding to the regenerative braking effort to urge the solenoid plunger 42 rearward. As the regenerative braking effort increases, the urging force which urges the solenoid plunger 42 rearward increases, whereby the output from the brake booster VBB is reduced.

In the meantime, the output from the brake booster decreases, and accordingly, the brake reaction which is transmitted from the piston of the master cylinder through the output shaft 54, the reaction disc 53, the solenoid plunger 42, the valve plunger 18 and the input shaft 17 to the brake pedal is reduced. However, the urging force mentioned above which corresponds to such reduction is applied from the solenoid plunger 42 to the valve plunger 18, maintaining the force of depression applied to the brake pedal constant, avoiding any sense of unnaturalness which a driver may experience.

When the regenerative braking effort becomes to be constant, the output from the brake booster is also maintained constant. When the regenerative braking effort decreases, the output from the brake booster is increased in a corresponding manner. When a regenerative braking effort becomes equal to zero or when the regenerative brake unit RB ceases to operate, the controller ECU deenergizes the solenoid 41.

Third Embodiment

Figure 7:
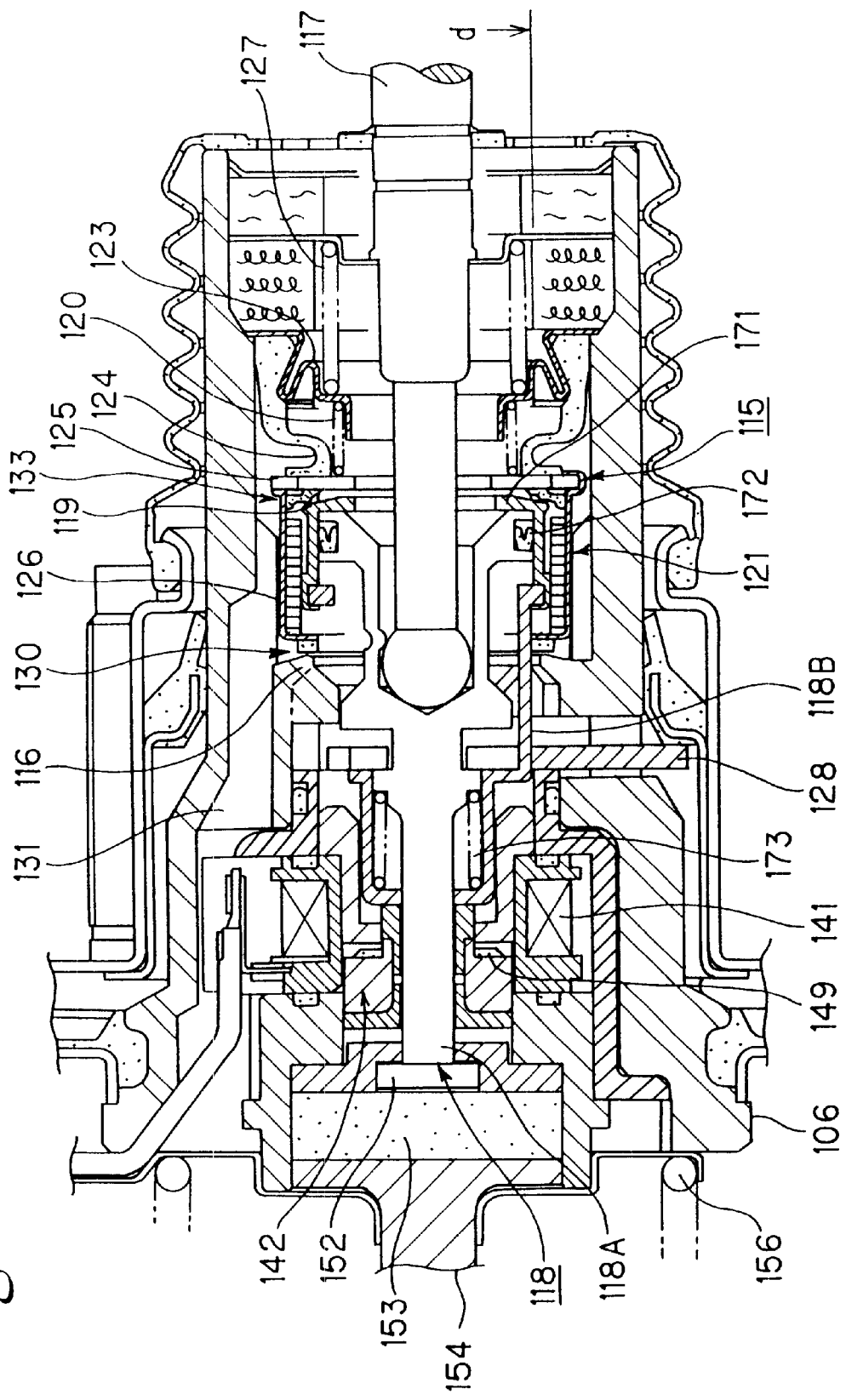
FIG. 7 is a cross section, to an enlarged scale, of an essential part of a third embodiment of the invention.

FIG. 7 shows a third embodiment of the invention. In the first embodiment, the second valve seat 19 is provided directly on the rear end of the valve plunger 18, but in the present embodiment, a valve plunger 118 comprises a member 118A located toward an input shaft and a member 118B located toward a valve. The member 118A located toward the input shaft is connected to an input shaft 117 while a second valve seat 119 which forms an atmosphere valve 133 is formed on the member 118B located toward the valve.

Specifically, the valve associated member 118B is tubular and has a rear end which is provided with a radially inwardly extending stop 171, on the rear end face of which the second valve seat 119 is formed. The valve associated member 118B is slidably disposed in surrounding relationship with the input shaft associated member 118A with a hermetic seal being maintained by means of a seal 172. A spring 173 is disposed between the members 118B and 118A to urge the member 118B forwardly relative to the member 118A, thus normally maintaining them in their advanced end positions where the rear end face of the member 118A abuts against the front end face of the stop 171 and thus integrally connecting them together. At this time, the outer diameter d of the seal member 172 is substantially equal to the effective diameter d of a rolling portion 124 of a valve body 121, thus preventing a pressure differential from being developed across the atmosphere valve 133.

A key member 128 extends through a notch formed in the tubular valve associated member 118B to engage the input shaft associated member 118A. The input shaft associated member 118A slidably extends through a solenoid plunger 142 so that its distal end directly abuts against a plate plunger 152 to be mechanically coupled with a reaction disc 153 through the plate plunger 152. A poppet return spring 120, which urges the valve element 121 forwardly, is disposed between a backup plate 125 and a retainer 123.

In other respects, the arrangement is similar to the first embodiment, and accordingly, principal parts which correspond to those shown in the first embodiment are designated by like reference characters as used in the first embodiment, to which 100 is added.

Operation

With the above arrangement, when the regenerative brake unit is inoperative, a solenoid 141 is not energized. Under this condition, the input shaft associated member 118A and the valve associated member 118B which form together the valve plunger 118 operate in an integral manner while they are maintained in the condition shown in FIG. 7 by the spring 173, and a resulting operation remains similar to the operation of a conventional brake booster.

Figure 8:
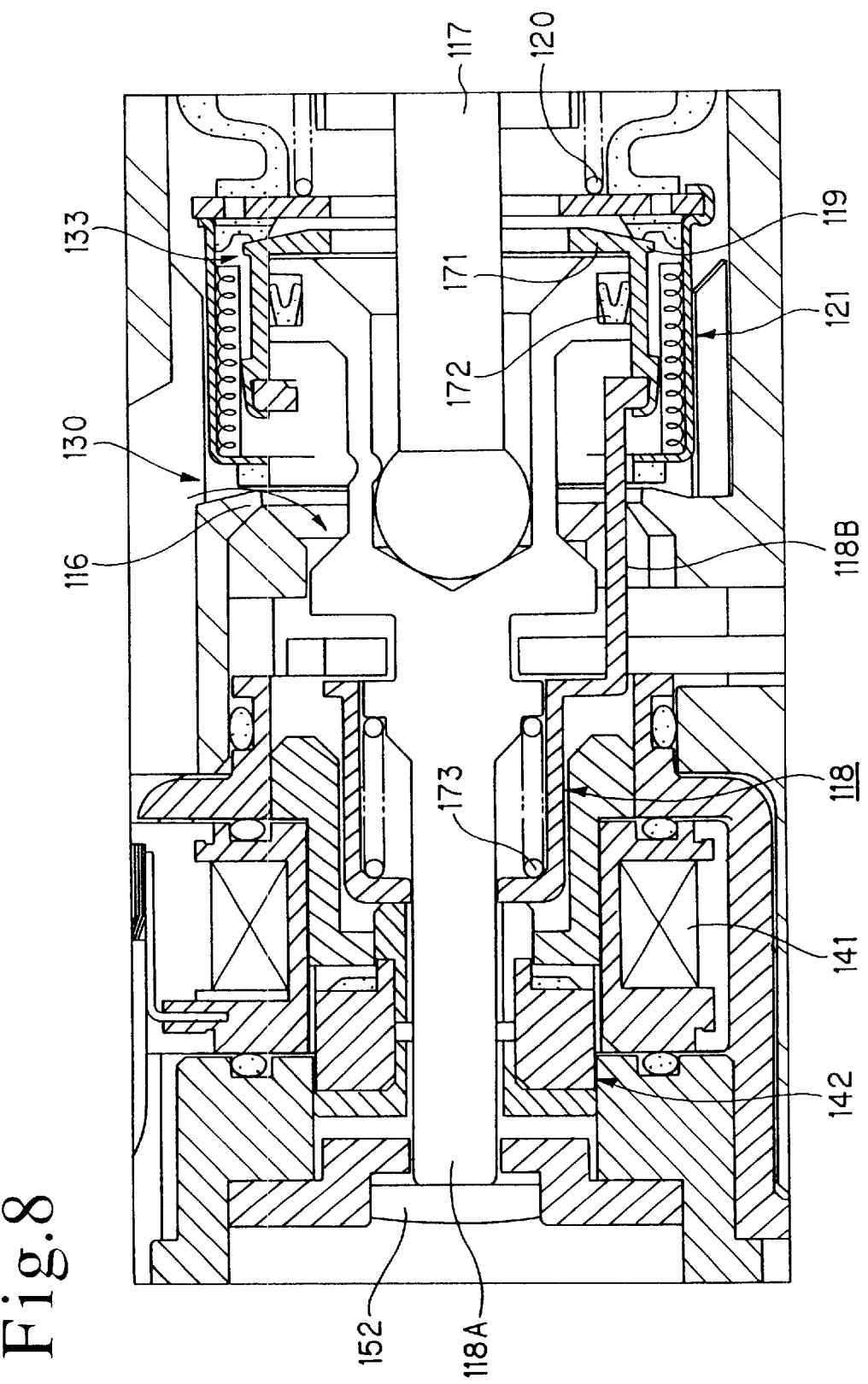
FIG. 8 is a cross section illustrating an operational phase which is different from that shown in FIG. 7.

When the regenerative brake unit becomes operative to produce a regenerative brake effort under the condition that the brake pedal is depressed, the controller detects the operation of the regenerative brake unit to energize the solenoid 141, in the similar manner as in the first embodiment, thereby urging the solenoid plunger 142 rearward with a force which depends on the regenerative braking effort. Then, the valve associated member 118B is displaced rearward against the spring 173 and the poppet return spring 120, leaving the input shaft associated member 118A behind, as shown in FIG. 8, whereby the valve element 121 moves away from a first valve seat 116 to open a vacuum valve 130, thus reducing an output from the brake booster.

At this time, it is only required that the force applied by the solenoid 141 to urge the solenoid plunger 142 be sufficient to cause a displacement of the valve associated member 118B in the rearward direction while overcoming the resilience of the poppet return spring 120 and the resilience of the spring 173 disposed between the both members 118B and 118A, and there is no need to cause the valve plunger 18 to retract while overcoming the force of depression applied to the brake pedal as occurs in the first embodiment, thus allowing the output from the solenoid 141 to be reduced. This allows the power dissipation to be reduced. At this time, the front end face of the stop 171 is spaced from the rear end face of the input shaft associated member 118A.

Figure 9:
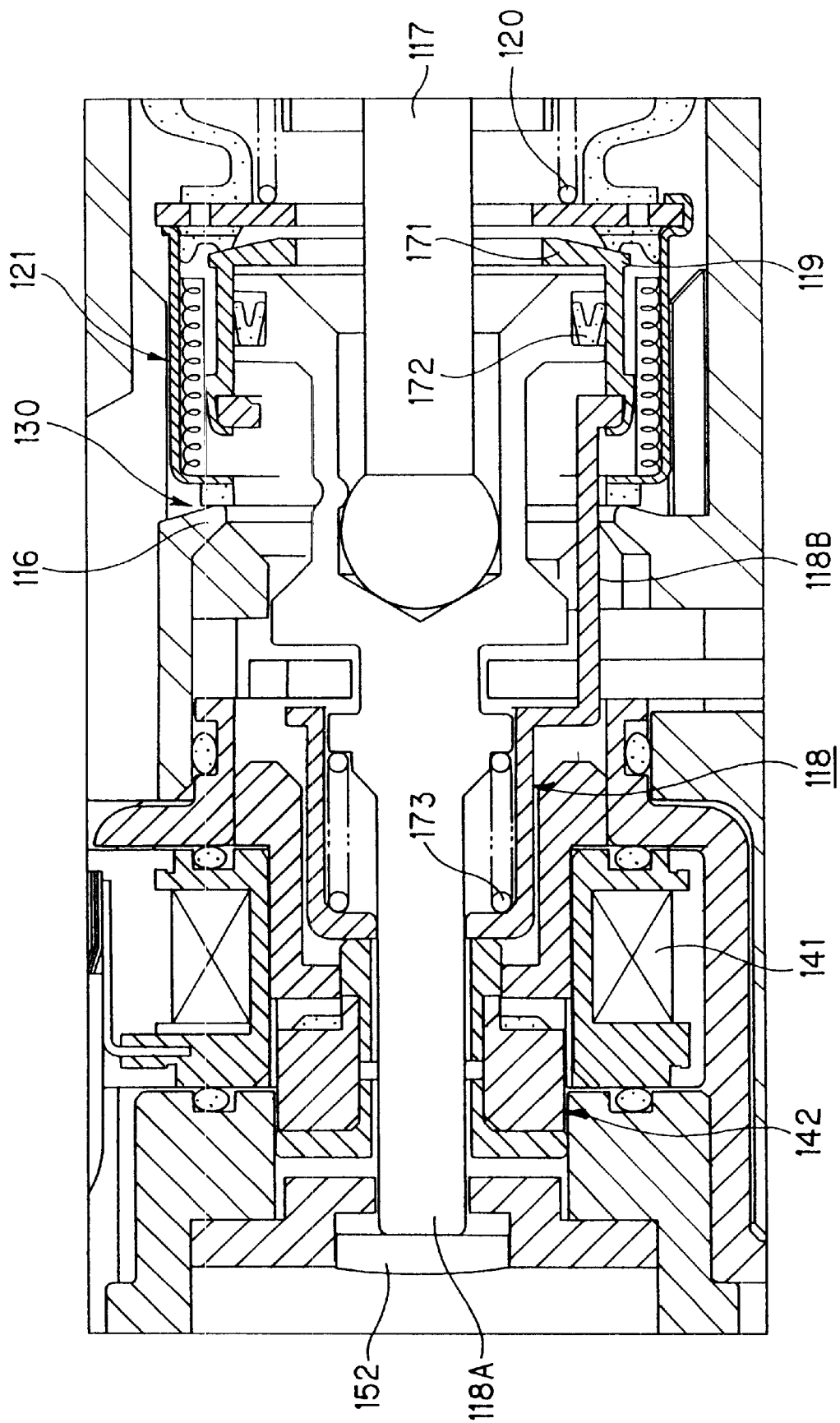
FIG. 9 is a cross section of a further operational phase which is different from those shown in FIGS. 7 and 8.

When the vacuum valve 130 is opened, the pressure in the variable pressure chamber finds its way into the constant pressure chamber, whereby a pressure differential between the atmospheric pressure and the pressure within the variable pressure chamber, which acts upon the valve element 121, increases. Accordingly, the valve element 121 is more strongly urged forward, and as the output from the brake booster is reduced by an amount corresponding to the force by which the solenoid plunger 142 urges or corresponding to the magnitude of the regenerative braking effort, the valve element 121 will be seated upon the first valve seat 116 to close the vacuum valve 130 (see FIG. 9). Under this condition, the front end face of the stop 171 remains spaced from the rear end face of the input shaft associated member 118A.

At this time, the output from the brake booster is reduced, whereby the brake reaction which is transmitted from the output shaft through a reaction disc 153, the plate plunger 152, the input shaft associated member 118A and the input shaft 117 to the brake pedal will also be reduced, but a force which corresponds to such reduction is applied from the solenoid plunger 142 to the input shaft associated member 118A through the spring 173, thus allowing the force of depression applied to the brake pedal to be maintained constant, avoiding any sense of unnaturalness which a driver may experience.

When the regenerative braking effort becomes to be constant, the output from the brake booster will be maintained constant. If the regenerative braking effort is reduced, the output from the braking booster will increase in a corresponding manner. When the regenerating braking effort becomes equal to zero or the regenerative brake unit ceases to operate, the controller deenergizes the solenoid 141.

A Specific Form of the Second Embodiment

Figure 10:
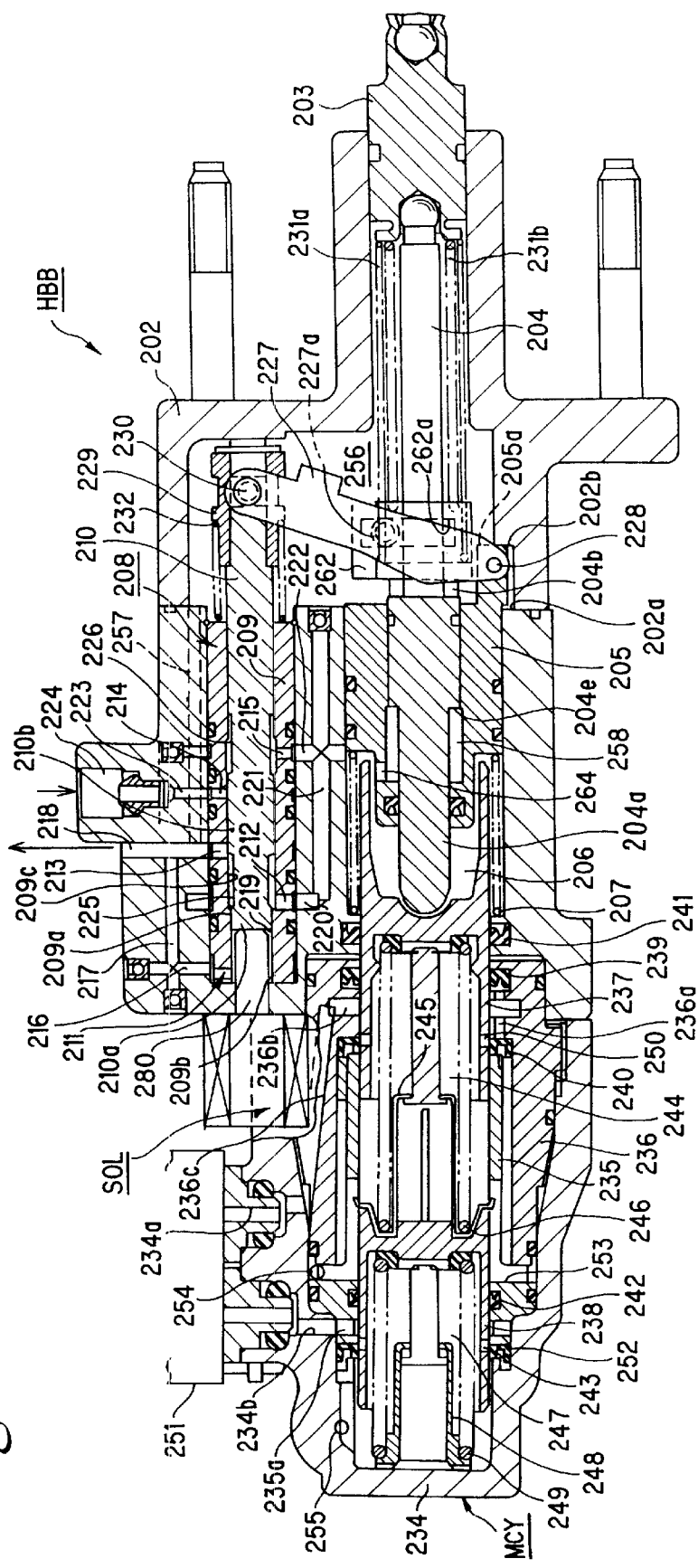
FIG. 10 is a cross section of a specific form of the second embodiment shown in FIG. 2.

A specific form of the brake system using the liquid pressure operated brake booster HBB shown in FIG. 2 will now be described. As shown in FIG. 10, the brake booster HBB is integrally connected with a master cylinder to be described later, and the master cylinder is operated by an output from the brake booster HBB.

The brake booster HBB includes a housing 202, in which an input piston 203 is slidably fitted in a liquid tight manner. The input piston 203 is connected to the brake pedal BP and is also connected to an input shaft 204.

A power piston 205 is disposed coaxially with the input shaft 204 and in liquid tight manner within the housing 202, and defines a power chamber 206 forwardly thereof In this manner, in this example of the brake booster HBB, the power piston 205 functions as a plug which defines the power chamber 206, and does not function to develop an output from the brake booster HBB. At its rear end, the power piston 205 has a lever support 205a which is disposed to be movable through a given travel between a first and a second step 202a, 202b of the housing 202, and is urged by a spring 207 which is compressed within the power chamber 206 to abut against the second step 202b.

Figure 11:
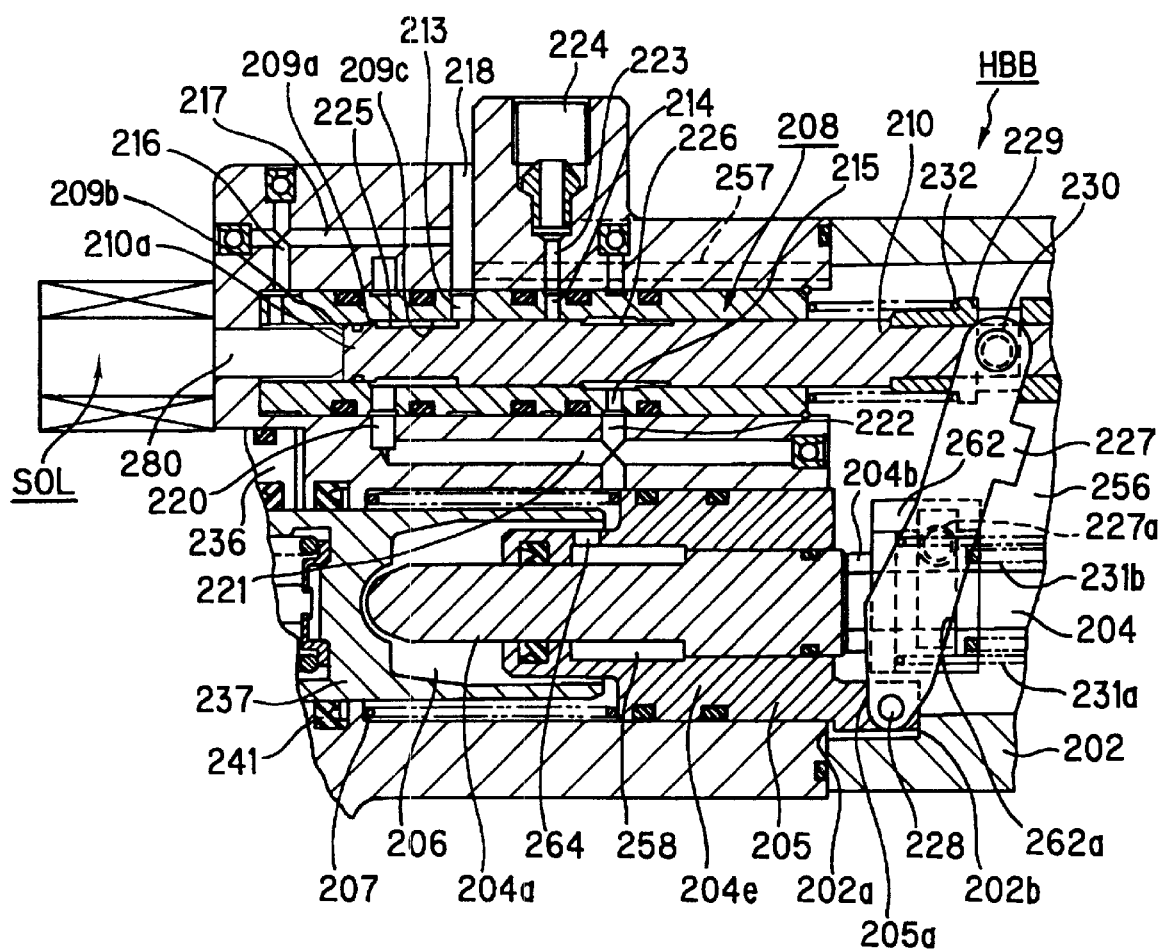
FIG. 11 is a cross section, to an enlarged scale, of an essential part shown in FIG. 10.

As shown in FIGS. 10 and 11, the input shaft 204 has a front end 204a which is stepped into a smaller diameter toward the front end, and the portion of the smaller diameter projects through the power piston 505 in a liquid tight manner into the power chamber 206. A step 204e of the front end 204a is situated in an annular reaction chamber 258 which is formed between the outer peripheral surface of the front end 204a and the inner peripheral surface of the power piston 205. When a liquid pressure is introduced into the reaction chamber 258, such liquid pressure acts upon the step 204e to transmit a reaction to the input shaft 204.

A valve mechanism 208 is provided within the housing 202. The valve mechanism 208 comprises a valve sleeve 209 which is fitted into and secured in the housing 202 in a liquid tight manner, and a valve spool 210 which is slidably fitted into the valve sleeve 209. The valve sleeve 209 has an axial cylinder bore which is formed with a step 209a, thus providing a stepped bore including a forwardly located cylinder bore 209b of a smaller diameter and a cylinder bore 209c of a larger diameter extending from the middle to the rear end thereof. A first to a fifth radial opening 211, 212, 213, 214 and 215 are formed in the valve sleeve 209 in the sequence beginning with one located toward the front end. The first radial opening 211 is formed in the region of the cylinder opening 209b of a smaller diameter while the second to the fifth radial opening 212, 213, 214, 215 are formed in the region of the cylinder opening 209c of a larger diameter.

The first radial opening 211 is normally connected to a reservoir, not shown, of a brake booster through path openings 216, 217, 218 formed in the housing 202, and accordingly, a space 219 in the valve sleeve 209 which is located forward of the valve spool 210 is normally in communication with the reservoir. The second radial opening 212 communicates with the power chamber 206 through path openings 221, 222 formed in the housing 202, and also communicates with the reaction chamber 258 through a path opening 264 formed in the power piston 205. The third radial opening 213 is normally connected to the reservoir of the brake booster through a path opening 218. The fourth radial opening 214 is normally connected to an accumulator, serving as a source of liquid pressure, not shown, through a path opening 223 and a liquid pressure inlet 224, both formed in the housing 202, and accordingly, the liquid pressure which is accumulated in the accumulator by a pump, not shown, associated with the source of the liquid pressure is normally introduced into the opening 214. The fifth radial opening 215 is normally connected to the power chamber 206 and the reaction chamber 258 through a path opening 222 formed in the housing 202.

The valve spool 210 is stepped, including a spool portion 210a of a smaller diameter located toward the front end and a spool portion 210b of a larger diameter and extending from the middle to the rear end. The spool portion 210a of a smaller diameter is slidably fitted into the cylinder bore 209b of a small diameter of the valve sleeve 209 in a liquid tight manner, and the spool portion of a larger diameter is slidably fitted into the cylinder bore 209c of a larger diameter of the valve sleeve 209. The valve spool 210 is formed with a first annular groove 225 between the spool portions 210a and 210b, and a second annular groove 226 in the spool portion 210b of a larger diameter.

The first annular groove 225 is normally connected to the second radial opening 212, and is connected to the third radial opening 213 when the valve spool 210 is inoperative to connect the power chamber 206 with the reservoir for the brake booster so that the liquid pressure in the power chamber 206 is established at the atmospheric pressure. When the valve spool 210 is driven forward, it is disconnected from the third radial opening 213 to isolate the power chamber 206 from the reservoir for the brake booster. The combination of the third radial opening 213 and the first annular groove 225 forms a liquid pressure discharge valve. The second annular groove 226 is normally connected to the fifth radial opening 215, and when the valve spool 210 is inoperative, it is disconnected from the fourth radial opening 214 to isolate the power chamber 206 from the accumulator of the source of liquid pressure. When the valve spool 210 is driven forward, it is connected to the fourth radial opening 214 to connect the power chamber 206 with the accumulator so that the valve mechanism 208 controls the liquid pressure in the accumulator in accordance with the input, and delivers a liquid pressure therefrom which is then introduced into the power chamber 206. The combination of the fourth radial opening 214 and the second annular groove 226 forms a liquid pressure supply valve.

When the liquid pressure discharge valve is closed and the liquid pressure supply valve is open to introduce the liquid pressure into the power chamber 206 as will be described later, the liquid pressure in the power chamber 206 is also introduced into the first annular groove 225, whereby the liquid pressure in the first annular groove 225 acting on the spool portions 210a and 210b of a smaller and a larger diameter and thus having different pressure responsive areas produces an effect which urges the valve spool 210 to the right or toward its inoperative position.

A lever 227 has one end which is rockably mounted by a first support pin 228 on the lever support 205a of the power piston 205. The other end of the lever 227 is rockably mounted on a valve actuating member 229 by a second support pin 230.

A retainer 262 is slidably fitted over the input shaft 204, and a first and a second return spring 231a, 231b are disposed between the retainer 262 and the input piston 203.

The first return spring 231a is normally compressed between the input piston 203 and the retainer 262, thus normally urging the input piston 203 and the input shaft 204 rearward relative to the retainer 262. The second return spring 231b has a free length without abutment against the retainer 262 when the input piston 203 is inoperative, but after a given stroke of the input piston 203, it abuts against the retainer 262 to be subsequently flexed together with the first return spring 231a. When the input shaft 204 is inoperative, a flange 204b of the input shaft 204 abuts against the retainer 262, thus restricting a limit of retracting movement of the input shaft 204.

The retainer 262 is formed with a vertically elongate slot 262a, in which an engaging pin 227a which extends inwardly form the lever 227 is fitted so as to be engageable in a fore-and-aft direction (or in a lateral direction as viewed in FIG. 11) and to be slidable in the vertical direction. A distance between the first support pin 228 and the engaging pin 227a is chosen to be always less than a distance between the engaging pin 227a and the second support pin 230 independently from the operative and the inoperative condition of the brake booster HBB.

The valve actuating member 229 is fitted into and secured to the valve spool 210, and is normally urged rearward by a spool return spring 232. In the inoperative condition of the booster, the valve actuating member 229 and the valve spool 210 assume inoperative positions where the rear end of the valve spool 210 abuts against the housing 202.

A solenoid SOL is disposed coaxially with the valve spool 210 in the housing 202, and when it is energized, its movable plunger 280 urges the valve spool 210 toward its inoperative position.

Master Cylinder

Figure 12:
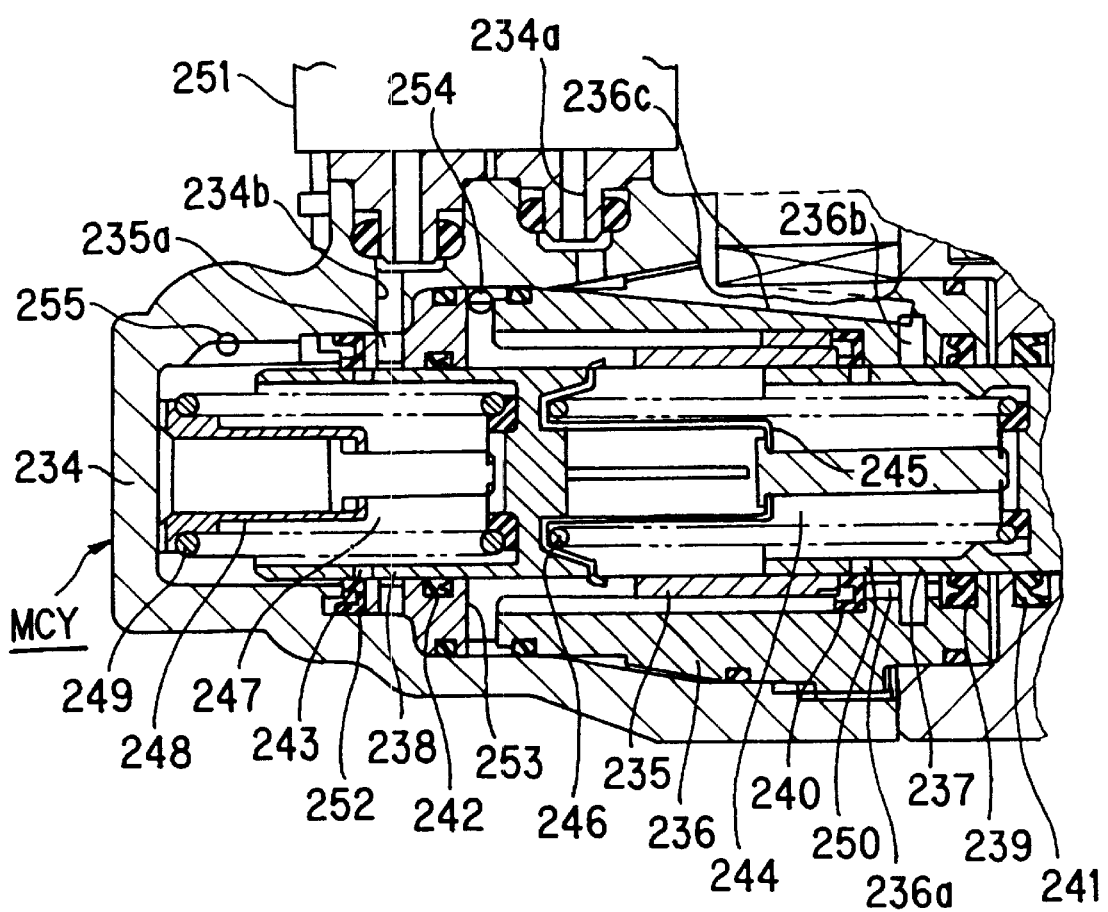
FIG. 12 is a cross section, to an enlarged scale, of an essential part shown in FIG. 10 which is different from that shown in FIG. 11.

A master cylinder will now be described. As shown in FIGS. 10 and 12, a master cylinder MCY includes a tubular housing 234 which has an opening in its rear end. A sleeve 235 is disposed within the housing 234 and a tubular cap 236 is threadably engaged in the housing 234 in a liquid tight manner so as to support the sleeve 235 by cooperating with the housing 234. The cap 236 is fitted into and secured to the housing 202 associated with the brake booster in a liquid tight manner. The master cylinder MCY is constructed as a tandem master cylinder including a primary piston 237 and a secondary piston 238 which have an equal effective pressure response area.

The primary piston 237 is disposed in the power chamber 206 of the housing 202 associated with the brake booster and in the bores of the cap 236 and the sleeve 235. The primary piston 237 is disposed to be slidable while maintaining a liquid tightness by a first cup seal 239 disposed on the inner periphery of the bore in the cap 236 and a second cup seal 240 disposed between the sleeve 235 and the cap 236 and mounted on the inner periphery of the bore of the cap 236. The second cup seal 240 is arranged to permit a flow of the liquid from the rear side to the front side thereof while blocking a liquid flow in the opposite direction. In addition, the primary piston 237 is supported to be slidable while maintaining a liquid tightness with respect to the housing 202 associated with the liquid pressure operated booster by a third cup seal 241, and has a rear end which faces the power chamber 206.

The secondary piston 238 is disposed in the bore of the sleeve 235 and the housing 234 for the master cylinder. The secondary piston 238 is disposed to be slidable while maintaining a liquid tightness by a fourth cup seal 242 provided on the inner periphery of the bore of the sleeve 235 and a fifth cup seal 243 provided on the inner periphery of the bore of the housing 234 for the master cylinder and disposed between the housing 234 and the sleeve 235. The fifth cup seal 243 permits a flow of liquid form the rear side to the front side thereof while blocking a liquid flow in the opposite direction.

A primary chamber 244 is defined between the primary piston 237 and the secondary piston 238, and a primary return spring 246 is compressed therebetween and has a maximum length which is defined by a primary spring retainer 245. A secondary chamber 247 is defined between the housing 234 for the master cylinder and the secondary piston 238, and a secondary return spring 249 is compressed therebetween and has a maximum length which is defined by a secondary spring retainer 248. It is to be noted that the resilience of the primary return spring 246 is less than the resilience of the secondary return spring 249.

The primary piston 237 is formed with a diametrical opening 250, which is located slightly rearward of the cup seal 240 when the primary piston 237 assumes its inoperative position shown. At this time, the primary chamber 244 is connected to a reservoir 251 for the master cylinder through the diametrical opening 250, a clearance between the rear surface of the cup seal 240 and the cap 236, an axial opening 236a formed in the cap 236, a circumferential groove 236b formed around the cap 236 between the cup seals 239 and 240, an inclined opening 236c axially continuing from the circumferential groove 236b and a diametrical opening 234a in the housing 234 for the master cylinder.

Accordingly, under this condition, no master cylinder pressure is developed in the primary chamber 244. As the primary piston 237 moves forward to position the diametrical opening 250 forward of the cup seal 240, a flow of the liquid from the primary chamber 244 to the reservoir 251 is interrupted, whereby a master cylinder pressure is developed in the primary chamber 244.

The secondary piston 238 is formed with a diametrical opening 252, which is located slightly rearward of the cup seal 243 when the secondary piston 238 assumes its inoperative position shown. At this time, the secondary chamber 247 is connected to the reservoir 251 for the master cylinder through the diametrical opening 252, a clearance between the inner periphery of the sleeve 235 and the secondary piston 238, the diametrical opening 235a formed in the sleeve 235 and the diametrical opening 234b formed in the housing 234 for the master cylinder.

Accordingly, under this condition, no master cylinder pressure is developed in the secondary chamber 247. As the secondary piston 238 moves forward to position the diametrical opening 252 forward of the cup seal 243, a flow of the liquid from the secondary chamber 247 to the reservoir 251 is interrupted, whereby a master cylinder pressure is developed in the secondary chamber 247.

The primary chamber 244 is connected to wheel cylinders W/C of one of two brake systems through an opening 253 formed in the sleeve 235 and a primary outlet 254 formed in the housing 234 for the master cylinder, and the secondary chamber 247 is connected to the wheel cylinders W/C of the other brake system through a secondary outlet 255 formed in the housing 234 for the master cylinder.

It is to be noted that a chamber 256 within the housing 202 associated with the brake booster HBB in which the lever 227 and the like are received is normally connected to the reservoir associated with the liquid pressure operated booster through a path opening 257 and the path opening 218, and thus is normally maintained at the atmospheric pressure.

Operation

With the brake booster HBB thus constructed, the solenoid SOL is deenergized when the brake is inoperative, and the input piston 203 and the input shaft 204 assume their retracted end positions shown in FIG. 10 and the lever 227 is in its inoperative position. Accordingly, the valve mechanism 208 is inoperative as shown, whereby the liquid pressure supply valve is closed while the liquid pressure discharge valve is open. The power chamber 206 and the reaction chamber 258 are both isolated from the accumulator and communicate with the reservoir for the liquid pressure operated booster, and thus the liquid pressure from the accumulator cannot be supplied to the power chamber 206 and the reaction chamber 258.

The master cylinder MCY does not operate, and the primary piston 237 assumes its inoperative position, which represents the retracted end position. At this time, the diametrical opening 250 in the primary piston 237 is located rearward of the second cup seal 240, and the primary chamber 244 communicates with the reservoir 251 for the master cylinder through the diametrical opening 250, the axial opening 236a, the circumferential groove 236b, the inclined opening 236c and the diametrical opening 234a in the housing 234. The diametrical opening 252 in the secondary piston 238 is located rearward of the fifth cup seal 243, and the secondary chamber 247 communicates with the reservoir 251 through the diametrical opening 252 and the pair of diametrical openings 235a and 234b. Accordingly, no master cylinder pressure is developed in the primary chamber 244 and the secondary chamber 247.

When the brake is actuated, an input or a force of depressing the brake pedal BP is applied to the input piston 203 and the input shaft 204, which therefore move forward. At this time, the elongate slot 262a in the retainer 262 is engaged with the engaging pin 227a in the fore-and-aft direction, and thus the retainer 262 does not follow the forward movement of the input piston 203 and the input shaft 204, but the first return spring 231a is flexed to increase its urging force. The increased urging force from the first return spring 231a is transmitted to the lever 227 through the engagement between the elongate slot 262a and the engaging pin 227a in the fore-and-aft direction, whereby the lever 227 rotates counter-clockwise about the first support pin 228. The counter-clockwise rotation of the lever 227 acts through the valve actuating member 229 to move the valve spool 210 forward. Thereupon the first annular groove 225 is disconnected from the third diametrical opening 213 to close the liquid pressure discharge valve while the second annular groove 226 is connected to the fourth diametrical opening 214 to open the liquid pressure supply valve, thus supplying the liquid pressure from the accumulator to the power chamber 206 and also to the reaction chamber 258.

The liquid pressure introduced into the power chamber 206 acts upon the rear end face of the primary piston 237 to move it forward. The liquid pressure in the power chamber 206 is also introduced into the first annular groove 225 through the path openings 221 and 220 and the second diametrical opening 212. The liquid pressure introduced into the first annular groove 225 acts on the spoon portions 210a and 210b of a smaller and a larger diameter and thus have different pressure responsive areas, thus urging the valve spool 210 in a direction to close the liquid pressure supply valve and to open the liquid pressure discharge valve. The valve spool 210 is controlled in a manner such that the resilience of the first return spring 231a or the input applied to the input piston 203 is balanced with the sum of the resilience of the spoon return spring 232 and the urging force applied to the valve spool 210 under the influence of the liquid pressure in the first annular groove 225. When the valve spool 210 is controlled to achieve such a balance, the power chamber 206 assumes a liquid pressure which corresponds to the input applied to the input shaft 204 or the depression force applied to the brake pedal, whereby the brake booster HBB assumes an intermediate load condition. This causes the output from the brake booster HBB to assume a magnitude which is equal to the magnitude of the input or the depression force applied to the brake pedal which is boosted. In other words, the liquid pressure in the power chamber 206 or the output from the brake booster HBB is controlled in accordance with the stroke of the input shaft 204 or the pedal stroke. In addition, the liquid pressure in the reaction chamber 258, which is equal to the liquid pressure in the power chamber 206, acts on the front end of the input shaft 204 in a direction to retract it, and thus is transmitted as a reaction to a driver through the brake pedal.

When the primary piston 237 moves forward and the diametrical opening 250 therein moves past the second cup seal 240, a master cylinder pressure is developed in the primary chamber 244. The combination of the master cylinder pressure developed in the primary chamber 244 and the resilience of the primary return spring 246 drives the secondary piston 238 forward, whereby the diametrical opening 252 therein moves past the fifth cup seal 243, thus developing a master cylinder pressure also in the secondary chamber 247. The master cylinder pressure developed in the primary chamber 244 is introduced into both wheel cylinders of one brake system through the primary outlet 254 while the master cylinder pressure developed in the secondary chamber 247 is introduced into both wheel cylinders of the other brake system through the secondary outlet 255, thus activating the two brake systems. At this time, the master cylinder pressures in the primary chamber 244 and the secondary chamber 247 are equal to each other, and thus a liquid pressure of an equal magnitude is supplied to the wheel cylinders of both brake systems. This braking liquid pressure has a magnitude which corresponds to the depression force applied to the brake pedal which is boosted.

When the brake pedal is released to deactivate the brake, the input shaft 204 retracts. The resilience exerted by the first and the second return spring 231*a*, 231*b* is then reduced, whereby the lever 227 rotates clockwise about the first support pin 228, allowing the valve actuating member 229 to retract. Thereupon, the second annular groove 226 is disconnected from the fourth diametrical opening 214 to close the liquid pressure supply valve while the first annular groove 225 is connected to the third diametrical opening 213 to open the liquid pressure discharge valve. Accordingly, the pressure liquid in the power chamber 206 and the reaction chamber 258 is discharged through the liquid pressure discharge valve into the reservoir for the liquid pressure operated booster, thus reducing the liquid pressure in the power chamber 206.

When the liquid pressure in the power chamber 206 is reduced, the combination of the master cylinder pressure in the primary chamber 244 and the resilience of the primary return spring 246 causes the primary piston 237 to retract. The level 227 rotates counter-clockwise about the second support pin 230 in response to the retracting movement of the power piston 205. As the primary piston 237 retracts, the master cylinder pressure in the primary chamber 244 is reduced, and the combination of the master cylinder pressure in the secondary chamber 247 and the resilience of the secondary return spring 249 causes the secondary piston 238 to retract. When the primary piston 237 and the secondary piston 238 retract, the diametrical opening 250 and the diametrical opening 252 move past the second cup seal 240 and the fifth cup seal 243, respectively, to be located rearward thereof, whereby the primary chamber 244 and the secondary chamber 247 both communicate again with the reservoir 251 for the master cylinder. Accordingly, the pressure liquid in the wheel cylinders of both brake systems are discharged into the reservoir 251 for the master cylinder through the primary chamber 244 and the secondary chamber 247.

When the input to the input piston 203 is reduced and the stroke of the input piston 203 decreases below a given amount, the second return spring 231*b* moves away from the retainer 262. Subsequently, when the input to the input piston 203 is removed and the liquid pressure in the power chamber 206 assumes the atmospheric pressure, the primary piston 237 assumes its inoperative position as does the secondary piston 238, and the master cylinder MCY no longer develops a master cylinder pressure. In this manner, both brake systems are rapidly released.

It is to be noted that in the brake booster HBB, when the solenoid SOL is energized during a normal operation, the liquid pressure in the power chamber 206 can be reduced independently from the input. Specifically, during a normal brake operation, as the valve spool 210 moves forward, it moves forward while pushing the movable plunger 280 associated with the solenoid SOL. Because the solenoid SOL is not energized at this point, the movable plunger 280 presents no resistance to the forward movement of the valve spool 210. Accordingly, the braking operation takes place without any influence by the solenoid SOL during a normal braking operation.

However, in the event there is a braking effort decrease demand signal during a normal braking operation, the solenoid SOL is energized with the current which corresponds to the magnitude of the demand signal. In response thereto, the movable plunger 280 associated with the solenoid SOL is activated to urge against the valve spool 210 in a direction to drive it toward its inoperative position. The first annular groove 225 is then connected to the third diametrical opening 213, thus reducing the liquid pressure in the power chamber 206 and decompressing the master cylinder pressure.

At this time, the valve spool 210 is controlled so that a resultant sum of the force with which the liquid pressure in the first annular groove 225 urges against the valve spool 210 in a direction to drive it toward its inoperative position, the resilience of the spool return spring 232 and the electromagnetic force from the solenoid SOL is balanced with the resilience of the return spring 231 which depends on the input stroke of the input shaft 204. Accordingly, the liquid pressure in the power chamber 206 will be reduced by an amount which corresponds to the magnitude of the electromagnetic force from the solenoid SOL which is applied to the valve spool 210 in a direction to urge it toward its inoperative position. Thus, by controlling the current fed to the solenoid SOL to set up a desired magnitude of the electromagnetic force, the liquid pressure in the power chamber 206 and the decompression of the master cylinder pressure can be achieved as desired.

During the decompression, there occurs no change in the resilience of the return spring 231 associated with the input shaft 204, and accordingly, there is no change in the input applied to and the input stroke of the input shaft 204. Thus it will be seen that the decompression control of the liquid pressure in the power chamber 206 has no influence whatsoever on the input side.

The liquid pressure in the power chamber 206 or the master cylinder pressure during the operation can be decompressed in accordance with the current fed to the solenoid SOL, and thus the decompression control of the master cylinder pressure can take place in any desired manner by suitably choosing the current fed to the solenoid.

Alternative Embodiment

Figure 13:
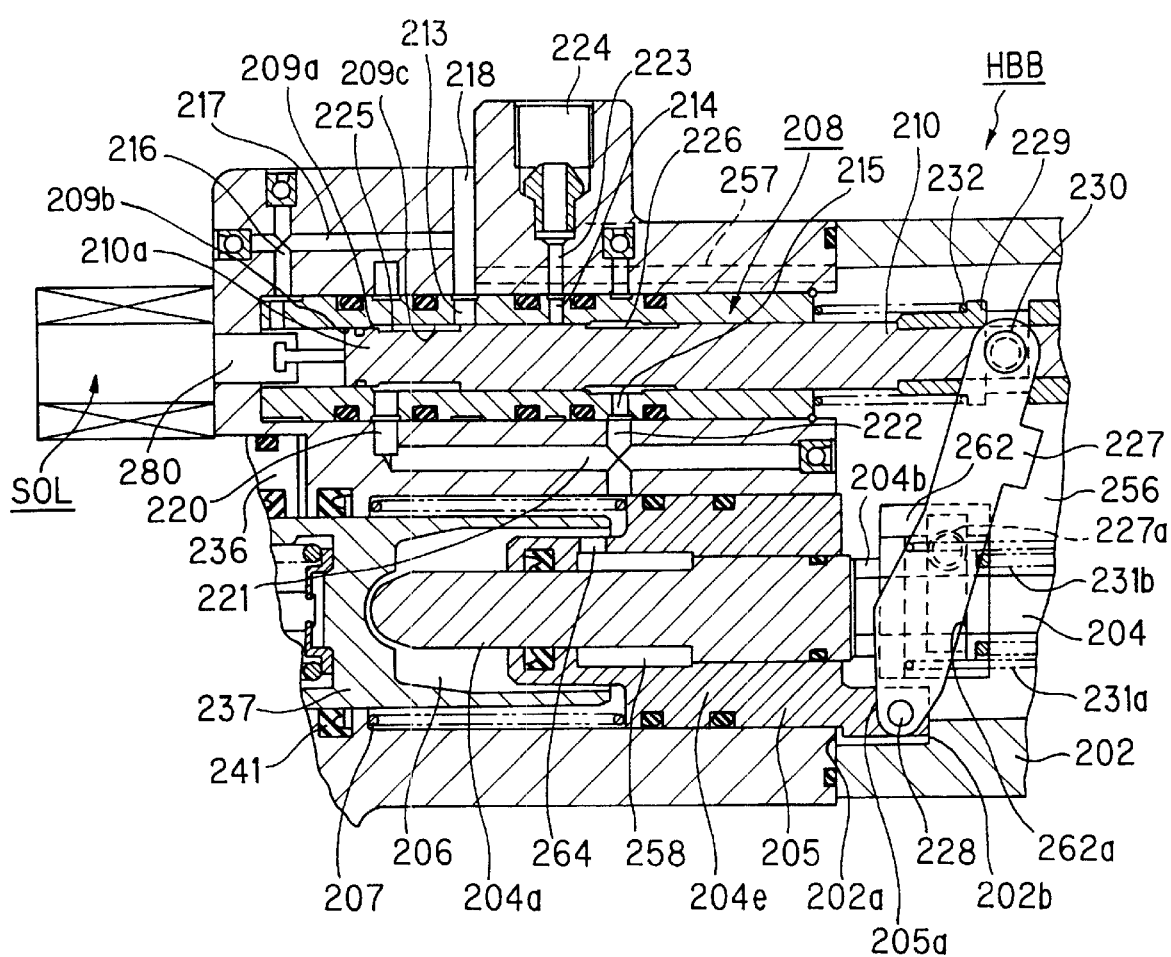
FIG. 13 is a cross section, to an enlarged scale, of an essential part of a fourth embodiment of the invention.

FIG. 13 shows an arrangement which is opposite to the embodiment shown in FIG. 11 in that an increase in the output from the brake booster HBB can be achieved in response to a braking effort increase demand signal. Specifically, in the embodiment shown in FIG. 11, the electromagnetic force from the solenoid SOL acts to urge the valve spool 210 in a direction to drive it toward its inoperative position. However, in the brake booster HBB of the present embodiment, the electromagnetic force from the solenoid SOL is effective to pull the valve spool 210 in the activating direction. Accordingly, the movable plunger 280 associated with the solenoid SOL and the valve spool 210 are connected together so that they are engaged to pull each other.

In other respects, the arrangement of the brake booster HBB of the present embodiment and the master cylinder MCY remains the same as in the embodiment shown in FIG. 11.

In the brake booster HBB described above, if the solenoid SOL is energized during a normal brake operation, the movable plunger 280 pulls the valve spool 210 in the activating direction. As the valve spool 210 moves to the left, the output pressure from the valve mechanism 208 rises as does the liquid pressure in the power chamber 206. Accordingly, the master cylinder pressure is intensified.

At this time, the valve spool 210 is controlled so that a resultant sum of the force with which the liquid pressure in the first annular groove 225 urges the valve spool 210 in a direction to drive it toward its inoperative position and the resilience of the spool return spring 232 is balanced with a resultant sum of the electromagnetic force from the solenoid and the resilience of the return spring 231 which depends on the input stroke of the input shaft 204. Accordingly, the liquid pressure in the power chamber 206 is intensified by an amount corresponding to the electromagnetic source from the solenoid SOL which is added to the valve spool 210 in the activating direction. Since the magnitude of the electromagnetic force can be chosen by controlling the current fed to the solenoid SOL, the liquid pressure in the power chamber 206 and the intensification control of the master cylinder pressure can be achieved as desired.

There occurs no change in the resilience of the return spring 231 associated with the input shaft 204 during the intensification control, and thus there is no change in the input applied to and the input stroke of the input shaft 204. Thus, the intensification control of the liquid pressure in the power chamber 206 has no influence whatsoever on the input side.

As described above, in accordance with the invention, the output from the brake booster can be freely controlled independently from the depression force applied to the brake pedal in response to a braking effort increase/decrease demand signal, and thus the invention is equally applicable to a wide variety of vehicle brake systems such as a regenerative brake unit, an engine brake, an exhaust gas brake unit, and a brake assisting apparatus.

While the invention has been disclosed in connection with several embodiments thereof, it should be understood that a number of changes, modifications and substitutions therein are possible from the above disclosure without departing from the spirit and scope of the invention defined by the appended claims.

What is claimed is:

1. A brake system comprising: a brake pedal; a brake booster comprising a valve mechanism which is urged by a depression force applied to the brake pedal to switch a flow path and cause the brake booster to develop an output which depends on the magnitude of the depression force; a solenoid for responding to a braking effort increase/decrease demand signal to increase or decrease a force with which it urges the valve mechanism in the same direction as or opposite direction to the depression force to cause the output from the brake booster to increase or decrease; a regenerative brake unit comprising a signal generating unit for generating a braking effort decrease demand signal and inputting the braking effort decrease demand signal to a controller; and a controller for receiving the braking effort decrease demand signal, calculating a value of current for energizing the solenoid depending on the magnitude of the braking effort decrease demand signal, energizing the solenoid with the calculated value of current and controlling the urging force of the solenoid based on the braking effort decrease demand signal.

2. A brake system according to claim 1, wherein the brake booster comprises a pneumatic pressure operated brake booster comprising a valve body slidably disposed within a shell, a power piston mounted on the valve body, a constant pressure chamber and a variable pressure chamber defined across the power piston, a valve mechanism mounted on the valve body for switching control of the flow path, and an input shaft mechanically coupled to the brake pedal for driving forward a valve plunger, which forms a part of the valve mechanism, to switch the flow path, and the solenoid includes a solenoid plunger which is slidably disposed between a reaction disc and the valve plunger of the brake booster to transmit an urging force to the valve plunger.

3. A brake system according to claim 2, wherein the valve plunger comprises an input shaft associated member which is connected to the input shaft, and a valve associated member which is disposed to be slidable with respect to the input shaft associated member and has a valve seat of the valve mechanism formed thereon, the valve associated member being normally maintained at an advanced end position where it is forwardly urged relative to the input shaft associated member, the solenoid plunger being effective to cause the valve associated member to displace rearwardly from the advanced end position.

4. A brake system according to claim 3 in which the input shaft associated member slidably extends through the solenoid plunger to be mechanically coupled to the reaction disc of the brake booster.

5. A brake system according to claim 2, further comprising a plate plunger slidably disposed between the reaction disc and the solenoid plunger and in which at least one of the abutting surfaces of the plate plunger and the solenoid plunger as well as at least one of the abutting surfaces of the solenoid plunger and the valve plunger both have a spherical surface.

6. A brake system according to claim 5 in which the solenoid plunger has an abutment member at its one end which is adapted to abut against the plate plunger and another abutment member at its other end which is adapted to abut against the valve plunger, each of the abutment members being formed with a spherical surface.

7. A brake system according to claim 1 in which the brake booster comprises a liquid pressure operated brake booster comprising an input shaft which is driven forward by a force of depression applied to a brake pedal, a lever having one end which is rockably mounted on a housing, a valve mechanism mechanically coupled to the other end of the lever to be actuated by a rocking motion of the lever, and a resilient member disposed between the input shaft and the lever to rock the lever in response to a forward movement of the input shaft, the valve mechanism being arranged such that a sum of a force resulting from an output liquid pressure from the liquid pressure operated brake booster and the urging force of the solenoid is balanced with an urging force of the resilient member.

8. A brake system according to claim 7 in which the valve mechanism comprises a valve spool which is mechanically coupled at its one end to the lever which in turn urges it in one direction while an output liquid pressure from the liquid pressure operated brake booster urges the valve spool in the other direction, the solenoid being effective to urge the valve spool in said one direction or in the other direction.

9. A brake system comprising: a brake pedal; a brake booster comprising a valve mechanism which is urged by a depression force applied to the brake pedal to switch a flow path and cause the brake booster to develop an output which depends on the magnitude of the depression force; a solenoid for responding to a braking effort increase/decrease demand signal to increase or decrease a force with which it urges the valve mechanism in the same direction as or opposite direction to the depression force to cause the output from the brake booster to increase or decrease; a brake assisting apparatus comprising a signal generating unit for generating a braking effort increase demand signal and inputting the braking effort increase demand signal to a controller; and a controller for receiving the braking effort increase demand signal, calculating a value of current for energizing the solenoid depending on the magnitude of the braking effort increase demand signal, energizing the solenoid with the calculated value of current and controlling the urging force of the solenoid based on the braking effort increase demand signal.

10. A brake system according to claim 9, wherein the brake booster comprises a pneumatic pressure operated brake booster comprising a valve body slidably disposed within a shell, a power piston mounted on the valve body, a constant pressure chamber and a variable pressure chamber defined across the power piston, a valve mechanism mounted on the valve body for switching control of the flow path, and an input shaft mechanically coupled to the brake pedal for driving forward a valve plunger, which forms a part of the valve mechanism, to switch the flow path, and the solenoid includes a solenoid plunger which is slidably disposed between a reaction disc and the valve plunger of the brake booster to transmit an urging force to the valve plunger.

11. A brake system according to claim 10, wherein the valve plunger comprises an input shaft associated member which is connected to the input shaft and a valve associated member which is disposed to be slidable with respect to an input shaft associated member and has a valve seat of the valve mechanism formed thereon, the valve associated member being normally at an advanced end position where it is forwardly urged relative to the input shaft associated member, the solenoid plunger being effective to cause the valve associated member to displace rearwardly from the advanced end position.

12. A brake system according to claim 11, wherein the input shaft associated member slidably extends through the solenoid plunger to be mechanically coupled to the reaction disc of the brake booster.

* * * * *